(12) United States Patent
Bode et al.

(10) Patent No.: US 11,229,086 B2
(45) Date of Patent: Jan. 18, 2022

(54) AD HOC COMMUNICATION NETWORK

(71) Applicant: SIEMENS MOBILITY GMBH, Munich (DE)

(72) Inventors: Christian Bode, Braunschweig (DE); Lars Bro, Olstykke (DK); Mikael Voss, Berlin (DE)

(73) Assignee: Siemens Mobility GmbH, Munich (DE)

( * ) Notice: Subject to any disclaimer, the term of this patent is extended or adjusted under 35 U.S.C. 154(b) by 116 days.

(21) Appl. No.: 16/488,679

(22) PCT Filed: Feb. 5, 2018

(86) PCT No.: PCT/EP2018/052732
§ 371 (c)(1),
(2) Date: Aug. 26, 2019

(87) PCT Pub. No.: WO2018/153640
PCT Pub. Date: Aug. 30, 2018

(65) Prior Publication Data
US 2019/0380170 A1   Dec. 12, 2019

(30) Foreign Application Priority Data

Feb. 24, 2017   (DE) ..................... 10 2017 203 040.2

(51) Int. Cl.
*B61L 27/00*   (2006.01)
*H04W 84/18*   (2009.01)
(Continued)

(52) U.S. Cl.
CPC ......... *H04W 84/18* (2013.01); *B61L 15/0027* (2013.01); *B61L 27/0005* (2013.01);
(Continued)

(58) Field of Classification Search
CPC .......... B61L 15/0027; B61L 2027/005; B61L 27/0005; B61L 27/0038; H04B 10/1143; H04W 84/18
See application file for complete search history.

(56) References Cited

U.S. PATENT DOCUMENTS

2004/0230345 A1   11/2004   Tzamaloukas
2004/0239268 A1*  12/2004   Grubba .................. A63H 30/04
                                                         318/268
(Continued)

FOREIGN PATENT DOCUMENTS

CN   101317394 A   12/2008
CN   103209020 A   7/2013
(Continued)

*Primary Examiner* — Jae Y Lee
*Assistant Examiner* — M Mostazir Rahman
(74) *Attorney, Agent, or Firm* — Laurence Greenberg; Werner Stemer; Ralph Locher

(57) ABSTRACT

An ad hoc communication network includes at least one vehicle-side radio device connected to a vehicle, a plurality of track-side radio devices installed on a track of the vehicle, and a monitoring and control unit, which is connected to at least one track-side radio device for communication. The track-side radio devices communicate, without logical connection with other track-side radio devices located within the radio range and with the vehicle-side radio device and forward received data to other track-side radio devices located within the radio range. At least two other track-side radio devices are located in each direction along the track within the radio range of each track-side radio device. The track-side radio devices transfer received data to the closest and to the second closest track-side radio device in at least one direction along the track.

8 Claims, 2 Drawing Sheets

(51) Int. Cl.
*B61L 15/00* (2006.01)
*H04B 10/114* (2013.01)

(52) U.S. Cl.
CPC ...... *B61L 27/0038* (2013.01); *H04B 10/1143* (2013.01); *B61L 2027/005* (2013.01)

(56) References Cited

U.S. PATENT DOCUMENTS

| | | |
|---|---|---|
| 2005/0174974 A1* | 8/2005 | Sonntag ............. B61L 27/0005 370/338 |
| 2008/0095134 A1 | 4/2008 | Chen et al. |
| 2009/0219900 A1 | 9/2009 | Kokkinen et al. |
| 2011/0075641 A1 | 3/2011 | Siriwongpairat et al. |
| 2012/0218886 A1 | 8/2012 | Van Phan et al. |

FOREIGN PATENT DOCUMENTS

| | | |
|---|---|---|
| DE | 102014214152 A1 | 1/2016 |
| EP | 2754582 A1 | 7/2014 |
| EP | 2797355 A1 | 10/2014 |
| JP | 2000016292 A | 1/2000 |
| WO | WO 2005020602 A2 | 3/2005 |
| WO | 2016012118 A1 | 1/2016 |

\* cited by examiner

AD HOC COMMUNICATION NETWORK

BACKGROUND OF THE INVENTION

Field of the Invention

The present invention relates to a system for ensuring a continuous communication in an ad hoc network, in particular between trains and track-side infrastructure.

Modern train control systems are based on continuous communication between trains and track-side infrastructure. These systems use wireless communication in order to implement a continuous communication connection between trains and line sections. Here, the implementation of the wireless communication is usually based on the network standard IEEE 802.11 (wireless LAN). In systems of this kind, access points are arranged along the railway line. These access points are connected to a network backbone cabled on the track side, a monitoring and control unit, wherein at least one redundant network cable is arranged along the required track, in order to enable communication with the relevant track-side communication partners, for example a track-side train control computer. In such an infrastructure network, a distinction is made between "access points", which are also referred to as base stations and are embodied as pieces of radio equipment along the line sections, and "stations", which are pieces of radio equipment on the train.

The stations—the pieces of radio equipment on the train—make their way along the route from access point to access point during the journey. In this context, at least one logical connection or a logical link is established between the train and a track-side access point in question in each case. A plurality of stations may have a logical connection to one access point, but a station may only ever be connected to precisely one access point along the line section. As a rule, access points do not set up logical connections to other access points. Stations also do not set up connections to other stations, as a rule. In this context, a logical connection means that a piece of train-mounted communication or radio equipment for sending and receiving data is permanently linked to a track-side access point or they are associated with one another, for example. This means that other access points of the network than the two connection partners likewise may possibly receive a sent data packet; this means that in some sense there is a physical connection. These received data packets, however, are discarded by the non-associated access points or are not processed any further. Only the logically connected access point processes the sent data.

During travel, there is a need to constantly set up a new logical connection of this kind to the subsequent access points along the route. A switch of the logical connection or the association from one access point to the next is referred to as "roaming". These handover/roaming methods are very difficult to perform at high speeds, due to handshake latency times for example. In addition, there is a further problem in the arrangement described above: The roaming decision is only based on the signal strength of an access point and not on whether a successful communication is possible via said access point. It is therefore possible for a connection to be established with a defective access point. The consequence would be a loss in communication. In the infrastructure networks of the prior art, communication is only possible with an existing logical connection of this kind. This approach is therefore prone to errors, time-consuming and inflexible.

On the other hand, ad hoc communication networks are known, which consist of a large number of pieces of communication equipment known as nodes. In an ad hoc communication network, no distinction is made between stations on the train and access points on the line section. A node may thus equally be a piece of train-mounted or track-side radio equipment. In an ad hoc communication network, a logical connection between two nodes is dispensed with. Each node can receive data from another node.

In ad hoc communication networks, however, there exists another problem—what is known as the "hidden node problem". In the hidden node problem, the mutual collision detection of two communication partners is impaired when in the radio coverage area of a common third communication partner. The problem is a consequence of the data transport in a radio network usually having to be controlled by a collision avoidance method. One collision avoidance method of the prior art is the CSMA/CA method (Carrier Sense Multiple Access/Collision Avoidance). The reason for the problem is that two nodes of the network, which operate on the same radio channel, are not able to make a radio transmission at the same time without the information of the transmissions being lost due to superimposition of the radio signals. This is referred to as collision. In order to avoid two or more nodes transmitting simultaneously, in the prior art these initially check whether another node is transmitting before an intended transmission. If this is the case, then a random time interval is waited and a new check is carried out. This procedure is repeated until the node identifies that no transmission by another node is taking place at a point in time. Only then does the node begin its transmission. In a hidden node problem, at least three nodes A, B and C are engaged on the same radio channel, wherein A and B, and B and C, are able to mutually receive with similar strengths in each case, but A and C are not able to receive. In this case, A is not able to ascertain whether C is carrying out a transmission and vice versa. If A now begins a transmission to B, while C is likewise carrying out a transmission to B, then a collision takes place. In the range of B, the two signals are superimposed and the information of the two transmissions is lost. As A and C are not able to receive each other, however, it is not possible for the two nodes to avoid the collision. The CSMA/CA method is thus not effective in this case.

At this point, it should be noted that it is also possible in principle for the hidden node problem to arise in an infrastructure network with a cabled network backbone such as that described in the introduction. In such a setup, however, this problem is primarily avoided by radio coverage areas of the track-side access points on the same channel not overlapping.

SUMMARY OF THE INVENTION

The object now consists in ensuring a continuous communication connection between trains and track-side infrastructure while excluding the disadvantages cited above.

According to the invention, an ad hoc communication network for distributing data of a vehicle or for a vehicle is proposed, which comprises at least one vehicle-side radio device connected to the vehicle for wireless communication, and also a plurality of track-side radio devices installed on a route of the vehicle for wireless communication. Furthermore, there is provision for a monitoring and control unit which is connected to at least one of the route-side radio devices for communication. The track-side radio equipment is configured to communicate wirelessly without logical connection to other track-side radio equipment situated in radio range and to the vehicle-side radio equipment, and to forward received data to other track-side radio equipment situated in radio range. The track-side radio equipment is arranged such that at least two other route-side radio devices are situated in any direction along the route in radio range of each of the route-side radio devices, and the route-side radio devices are embodied such that they transfer received data to the next route-side radio device and the piece of equipment after next in a direction along the route.

The invention achieves the object through the use of a wireless ad hoc communication network. Data in the ad hoc communication network according to the invention is always transferred to the next neighbor and the neighbor after next in at least one direction of the route. An ad hoc communication network of this kind which underlies the invention consists of a number of nodes or pieces of radio equipment linked together in a mesh-like manner, which are able to communicate with one another.

The nodes of the ad hoc communication network according to the invention are formed by the vehicle-side and the track-side radio equipment.

In a "meshed network", not every piece of radio equipment of the network has a permanent connection to all other pieces of radio equipment of the network, but each piece of radio equipment of the network is connected to at least one further piece of radio equipment of the network. Messages are transferred from a start node to an end node. If the end node is situated outside the range of the start node, then intervening nodes are used to forward the message. In ad hoc communication networks, which connect two or more objects as nodes to a meshed mobile network, the network is consistently adapting when nodes move, are added or drop out.

One advantage of the invention is that no logical connections are necessary in wireless ad hoc communication networks and thus also no roaming. In an ad hoc communication network, all nodes are able to receive data from other nodes. There is no concrete association. In this context, the nodes in an ad hoc communication network adapt to altered conditions by ascertaining which nodes are able to be reached by a radio transmission at the current point in time and, as a function thereof, make decisions to forward data.

Moreover, in networks of this kind, no distinction is made between trains and radio equipment along the route. Data is sent to all nodes in the radio coverage area. These nodes then transmit the data to one or more further nodes, which do not lie in the radio coverage area of the start node. This forwarding step or distribution step of data is repeated until the data has reached its final destination. Instead of the track-side access points, what are known as route-side radio devices are used along the line section. A wired connection, such as between the access points in previous systems, is no longer necessary in the track-side radio equipment.

In the ad hoc communication network according to the invention, a cabled monitoring and control unit (backbone) is dispensed with. The monitoring and control unit itself has a piece of radio equipment and is a node of the ad hoc communication network. The radio coverage areas of the nodes of the ad hoc communication network, in particular the track-side radio equipment, overlap. In this context, the hidden node problem is thus not a consequence of the switch from an infrastructure network to an ad hoc communication network per se, but rather a consequence of the lack of a cabled network backbone in such a network.

According to the invention, each route-side radio device is configured to communicate wirelessly with all route-side radio devices within their radio coverage area, and to transmit the data received from a first route-side radio device to at least one second route-side radio device which does not lie in the radio coverage area of the first route-side radio device. As a result, the redundancy and thus the reliability of the system is further increased. Advantageously, multiple route-side radio devices may be connected to the monitoring and control unit to increase the redundancy.

In a further preferred embodiment, the communication and data transfer for each direction along the route takes place via separate radio channels which are isolated from one another. This means that a separately oriented, channel-specific transceiver unit or antenna is used for receiving and transmitting in each case. By way of such an embodiment, a first solution for the "hidden node problem" is provided. Both the at least one vehicle-side radio device and also the track-side radio equipment may be configured to communicate on two different channels unidirectionally in each case. The track-side radio equipment preferably has two directed transceiver units, which are isolated from one another in each case and are configured to communicate on only one of the two channels in each case.

In a further preferred embodiment, the communication and data transfer takes place in an alternating pattern over three different radio channels. Thus, for each route-side radio device, three transceiver units are necessary. In this context, two transceiver units are used for bidirectional communication with the second piece of subsequent track-side radio equipment in each case, with a separate channel for each direction in each case. The third antenna is a receiving unit and serves to receive data from the directly adjacent track-side radio equipment. This arrangement is a second solution to the "hidden node problem" in an ad hoc communication network.

The route-side radio devices preferably each have two transceiver units and one receiver unit. The receiver unit is embodied for unidirectional data reception from the directly adjacent track-side radio equipment on a first radio channel. The two transceiver units are embodied for bidirectional communication with the route-side radio device after next in each case, wherein different second and third radio channels are used for each direction for communication along the route, which radio channels differ from the first radio channel in each case. The use of the at least three different radio channels per route-side radio device along the route takes place in an alternating, repeating sequence.

A first route-side radio device is configured to receive data from their directly adjacent track-side radio equipment via a first channel by means of the receiver unit, wherein a second route-side radio device, which is arranged directly adjacent to the first route-side radio device in a first direction, is configured to receive data from its two pieces of directly adjacent track-side radio equipment via a second channel different from the first channel by means of the receiver unit. A third route-side radio device, which is arranged directly adjacent to the first route-side radio device in a second direction opposite to the first direction, is configured to receive data from its two directly adjacent route-side radio devices via a third channel, different from the first and second channel, by means of the receiver unit.

In a preferred embodiment, the line section is a rail track. The vehicle is preferably a train. According to the invention, the communication between a train and radio equipment along a rail track is improved. In this case, the vehicle-side radio equipment may be integrated in a train control computer on the train. The monitoring and control unit may be a track-side device, which manages information of the train or for the train along its route.

It should be noted that vehicle-side and track-side radio equipment are functionally comparable with one another and are in each case capable of forwarding data in the same manner.

Preferably, each piece of radio equipment, whether this is vehicle-side or track-side radio equipment, is configured to communicate with all other pieces of radio equipment within their radio coverage area via radio, and to transmit the data received from a first piece of radio equipment to at least one second piece of radio equipment which does not lie in the radio coverage area of the first piece of radio equipment. As a result, the redundancy and thus the reliability of the system is further increased.

It should be noted that multiple route-side radio devices are able to be connected to the monitoring and control unit, which additionally reduces redundancy.

The use of ad hoc communication networks for train-to-track communication (also known as train-to-wayside communication) and the multi-stage forwarding of data via the radio channel lead to wide-reaching improvements compared to previous systems.

There is no longer any need for a transfer cable for the connection of track-side radio equipment, which means that it is possible for previously necessary fiber-optic cables for connecting the access points along the line section to be saved. In addition, there is no longer any speed restriction due to roaming latency times. Moreover, the forwarding by train-side radio equipment solves the connection problem of when a vehicle, for example a train, blocks the signal of a route-side radio device, in particular when traveling by an electronic view with low headway times (moving block driving) in a tunnel.

The ad hoc communication network, with its point-to-multipoint communication, thus increases the reliability of the system.

BRIEF DESCRIPTION OF THE SEVERAL VIEWS OF THE DRAWING

The above-described properties, features and advantages of this invention and the manner in which these are achieved will be described more clearly and explicitly with the following description of the exemplary embodiments, which are explained in more detail with the drawings, in which.

DESCRIPTION OF THE INVENTION

Figure 1:
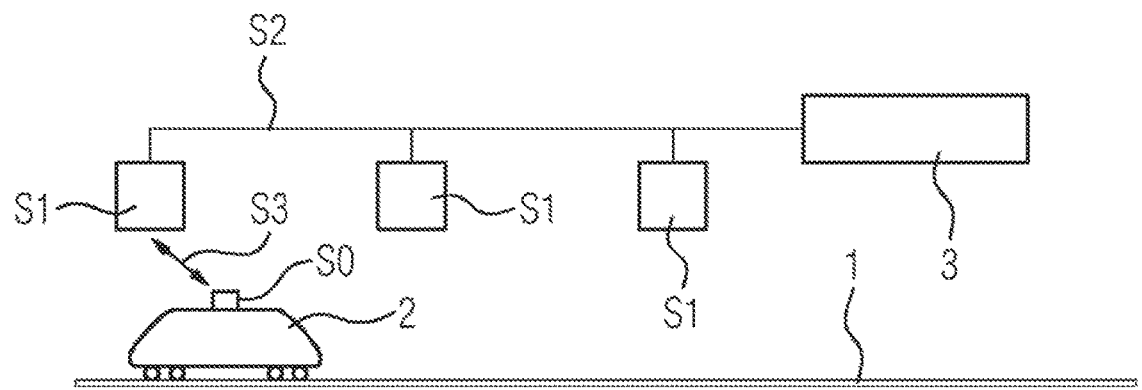
FIG. 1 shows the network topology for a train control system as the prior art.

In FIG. 1, the network topology for a communication network as per the prior art is shown, including a vehicle 2, here a train. In this system, access points S1 are arranged along a route 1 of the vehicle 2, which are connected to a network backbone S2 cabled on the track side, in order to enable communication with the relevant track-side communication partners, for example a train control computer as monitoring and control unit 3. There is a need to constantly establish a new communication connection between the moving vehicle 2 and a track access point S1. To this end, handover/roaming methods are necessary, which are very difficult to perform at high speeds of the vehicle 2, due to handshake latency times for example.

A system of this kind is highly prone to errors and the communication is time-consuming, primarily because it is only ever possible via one logical connection S3. A plurality of logical connections S3 may also exist between vehicle 2 and the track-side infrastructure, for reasons of redundancy.

Figure 2:
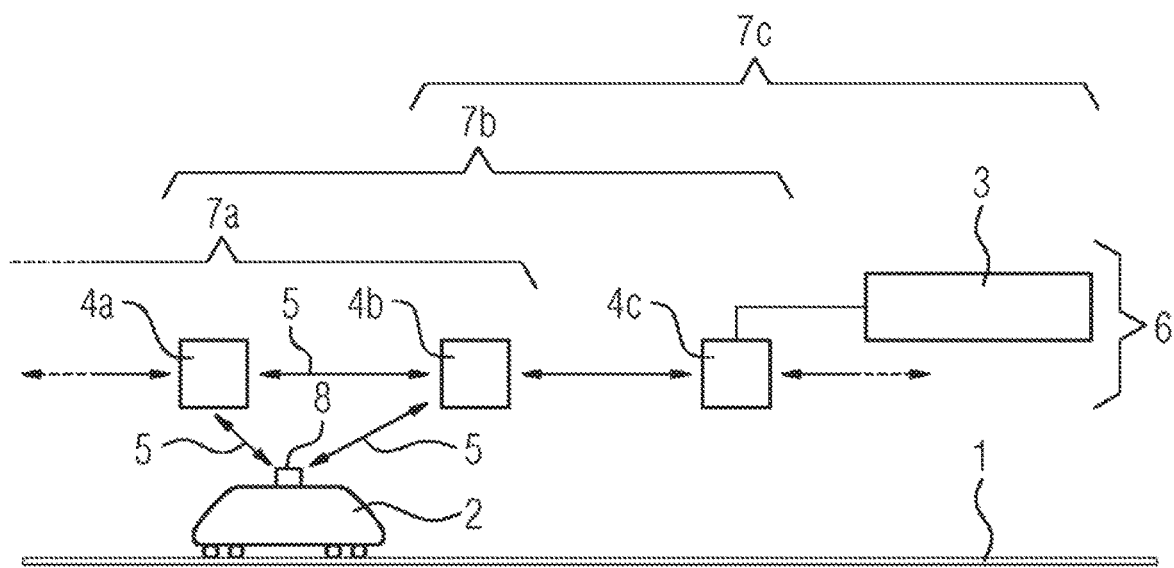
FIG. 2 shows an ad hoc communication network according to the invention in a first exemplary embodiment.

In FIG. 2, a system according to the invention for ensuring a continuous communication connection in a wireless ad hoc communication network between vehicles 2 moving forward along a line section 1 and track-side infrastructure 6 is shown in a first embodiment. The line section 1, for example (without being limited to) a rail track, is configured for the forward movement of the vehicle 2, for example a train, and the vehicle 2 shown is configured to move forward along the line section 1. A plurality of pieces of radio equipment 4a . . . c, 8 are arranged along the line section 1 and on the vehicle 2. At least one monitoring and control unit 3 for communication-based control and securing of the communication with or from the vehicle 2 is connected to at least one route-side radio device 4a . . . c of the track-side infrastructure 6.

In the exemplary embodiment shown, the track-side radio equipment 4a . . . c consists of three route-side radio devices 4a, 4b, 4c. In this context, for example, each route-side radio device 4a, 4b, 4c is able to communicate wirelessly with all other route-side radio devices 4a, 4b, 4c within their respective radio coverage area 7a . . . c. As a result, for example, the route-side radio device 4b is able to transfer the data received from the route-side radio device 4a to the route-side radio device 4c, which does not lie in the radio coverage area 7a of the first route-side radio device 4a. Each route-side radio device 4a . . . c in the radio coverage area 7a . . . c of another route-side radio device 4a . . . c is situated in the radio range of said other route-side radio device 4a . . . c.

Figure 3:
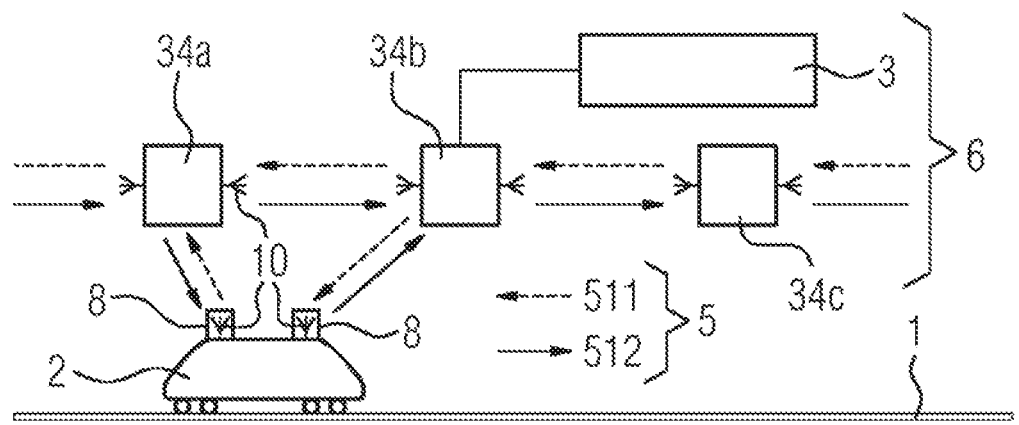
FIG. 3 shows an ad hoc communication network according to the invention in a second exemplary embodiment.

In FIG. 3, a system according to the invention for ensuring a continuous communication connection in a wireless ad hoc communication network between vehicles 2 moving forward along a line section 1 and track-side infrastructure 6 is shown in a second embodiment, wherein the at least one monitoring and control unit 3 is a train control computer or a commercially available computer, which ensures the continuous communication connection on the basis of a forwarding algorithm.

Here, the ad hoc communication network consists of the vehicle-side radio equipment 8, here for example two pieces of vehicle-side radio equipment 8, and the route-side radio devices 34a . . . c consisting of three route-side radio devices 34a, 34b and 34c. The monitoring and control unit 3 may likewise represent a node of the ad hoc communication network in a cabled or preferably cableless manner.

In this embodiment, the route-side radio devices 34a . . . c each have a separately oriented antenna or transceiver unit 10 for transmitting and receiving data. For each direction, the communication and data transfer takes place along the line section 1 via a separate channel 511 or 512. In the exemplary embodiment shown, the first channel 511 transmits from the second route-side radio device 34b to the first route-side radio device 34a. The third route-side radio device 34c transmits on this first channel 511 to the second route-side radio device 34b. The first channel 511 thus transmits from right to left along the route 1 in FIG. 3. As shown, the second channel 512 is used to send data from left to right along the route 1 in FIG. 3, i.e. to transmit from the first route-side radio device 34a to the second route-side radio device 34b and from the second route-side radio device 34b to the third route-side radio device 34c and so on.

In addition, the route-side radio devices 34a . . . c are configured here, as in FIG. 2, such that their radio coverage area (not shown here) in any direction along the line section 1 extends up to the second subsequent piece of radio equipment 34a . . . c. The radio coverage area of the first route-side radio device 34a thus extends up to the third route-side radio device 34c.

The hidden node problem is solved in this exemplary embodiment of a configuration with two different channels 511, 512 in that a transmission of data via one particular channel of the two radio channels 511, 512 only ever takes place in one physical direction. Although this may also lead to a superimposition of radio signal if, of three successive route-side radio devices 34a . . . c consisting of a first route-side radio device 34a, a second route-side radio device 34b and a third route-side radio device 34c, the first route-side radio device 34a and the second route-side radio device 34b transmit in the direction of the third route-side radio device 34c at the same time. Due to the increasing distance, however, the difference in field strengths of the two signals at the third route-side radio device 34c is great enough that the information of the transmission from the second route-side radio device 34b remains preserved. The distance between the route-side radio devices 34a . . . c and the transmit power is therefore to be dimensioned such that a transmission from the first route-side radio device 34a to the second, adjacent route-side radio device 34b is able to be received, but does not significantly affect a transmission from the second route-side radio device 34b to the third route-side radio device 34c adjacent to the second.

Figure 4:
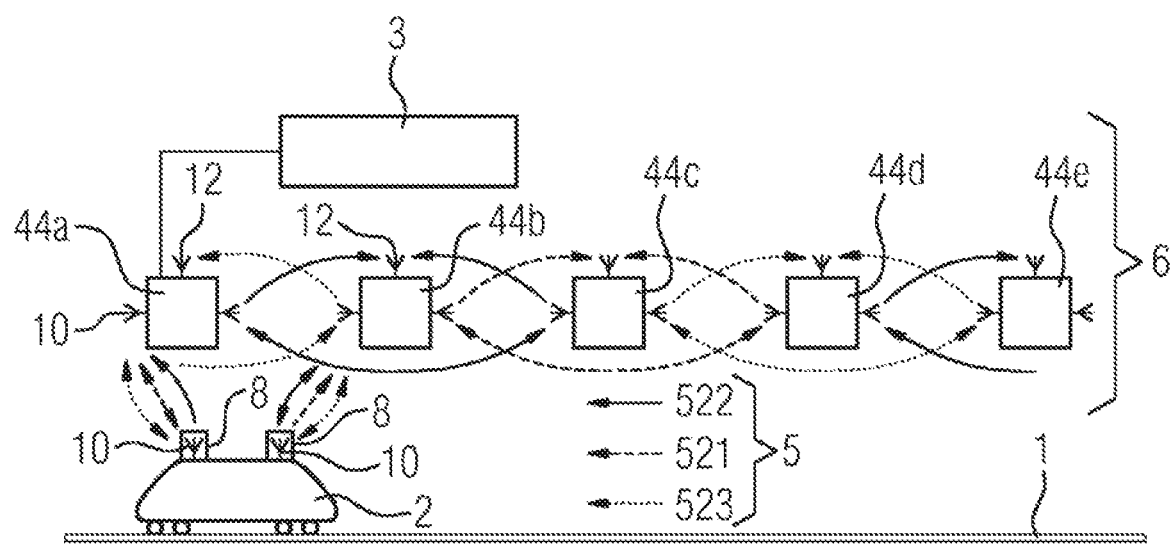
FIG. 4 shows an ad hoc communication network according to the invention in a third exemplary embodiment.

In FIG. 4, a system according to the invention for ensuring a continuous communication connection in a wireless ad hoc communication network between a vehicle 2 moving forward along a line section 1 and track-side infrastructure 6 is shown in a third embodiment. The track-side radio equipment 44a . . . e consists of five route-side radio devices 44a, 44b, 44c, 44d, 44e by way of example. In this exemplary embodiment, each route-side radio device 44a, 44b, 44c, 44d, 44e has two transceiver units 10 for bidirectional communication with the second subsequent piece of radio equipment 44a . . . e in each case, and also a receiving unit 12 for receiving data from the directly adjacent track-side radio equipment 44a . . . e. In this exemplary embodiment, the communication and data transfer takes place via three different radio channels 521, 522, 523 in a spatially alternating pattern.

A first route-side radio device 44a is configured to receive data from its two directly adjacent route-side radio devices 44a . . . e via the third channel 523 by means of its receiving unit 12. A second route-side radio device 44b, which is arranged directly adjacent to the first route-side radio device 44a—in FIG. 4 the right neighbor—in a first direction along the route 1, is further configured to receive data from its two directly adjacent route-side radio devices 44a, 44c via the second channel 522 by means of its receiver unit 12. A third route-side radio device 44c, which is arranged directly adjacent to the second route-side radio device 44b—in FIG. 4 the right neighbor again—in the first direction along the route 1, is configured to receive data from its two directly adjacent pieces of radio equipment 44b, 44d via the first channel 521 by means of its receiver unit 12.

According to the invention, data is thus transferred unidirectionally along the route 1 in a repeating pattern of alternating, different radio channels 5. In other words, transmission takes place unidirectionally along the route 1 from a route-side radio device 44a . . . e to the directly adjacent route-side radio device 44a . . . e on different radio channels in an alternating manner, modulo the number of different radio channels used. The sequence of the alternating radio channels thus repeats according to the number of radio channels. The sequence of the unidirectional transmission in FIG. 4 from left to right is as shown: third channel 523 (to the route-side radio device 44a), second channel 522 (to 44b), first channel 521 (to 44c), third channel 523 (to 44d), second channel 522 (to 44e) and so on.

According to the invention, each route-side radio device 44a . . . e is used to receive unidirectionally on a first channel, to communicate bidirectionally in a first direction along the route 1 on a second channel different from the first channel and to communicate bidirectionally in a second direction different from the first direction along the route 1 on a third channel different from the first and second channel.

In the example of FIG. 4 shown, the third route-side radio device 44c communicates bidirectionally with its right neighbor after next 44e on the third channel 523. Furthermore, it communicates bidirectionally with the left neighbor after next 44a on the second channel 522 and receives unidirectionally from its left and right direct neighbors via the first channel 521.

The second route-side radio device 44b communicates bidirectionally with its right neighbor after next 44d on the first channel 521 and communicates bidirectionally with the left neighbor after next on the third channel 523.

The third route-side radio device 44d communicates bidirectionally with its right neighbor after next on the second channel 522 and communicates bidirectionally with the left neighbor after next 44b on the first channel 521.

In other words, each route-side radio device 44a . . . e receives data from its directly adjacent route-side radio devices 44a . . . e on a first channel, communicates bidirectionally with its neighbor after next in a first direction along the route 1 on a second, different channel and communicates with its neighbor after next in a second direction opposite the first direction on a third channel different from the first and second channel.

In this multichannel configuration, three adjacent route-side radio devices, consisting of a first route-side radio device 44a, a second route-side radio device 44b and a third piece of track-side radio equipment 44c, use a first radio channel 521, wherein only the first route-side radio device 44a and the third route-side radio device 44c carry out transmissions of data on this channel, while the second route-side radio device 44b exclusively receives on this channel. Since, in this arrangement, only two route-side radio devices 44a . . . e carry out the transmission of data, it is not possible for the hidden node problem to arise within this triplet of route-side radio devices 44a, 44b, 44c. The following triplets of route-side radio devices 44b, 44c, 44d and 44c, 44d, 44e operate according to the same formula, but each use a different radio channel 552, 523, so that they are not able to disrupt the two previous and following triplets of route-side radio devices 44a . . . e due to their transmission. In the case of three different radio channels, the triplet 44d, 44e, 44f (not shown) which then follows once again uses the same radio channel as 44a, 44b, 44c. Interference, however, is avoided due to the distance between the nodes and the decreasing signal strength as a result. The greater the number of different radio channels which are able to be used, the greater the distance before a radio channel is reused. Any number of radio channels greater than or equal to 3 is possible.

Although the invention has been illustrated and described in detail based on preferred exemplary embodiments, the invention is not restricted by the examples given and other variations can be derived therefrom by a person skilled in the art without departing from the protective scope of the invention.

The invention claimed is:

1. An ad hoc communication network, comprising:
   at least one vehicle-side radio device connected to a vehicle for wireless communication;
   a plurality of route-side radio devices installed along a route of the vehicle for wireless communication;
   a monitoring and control unit which is connected to at least one of said route-side radio devices;
   said route-side radio devices being configured to communicate wirelessly without logical connection to other pieces of route-side radio devices located in radio range and to said vehicle-side radio device, and to forward received data to other track-side radio devices located in radio range;
   wherein said route-side radio device are arranged such that at least two other route-side radio devices in either direction along the route are in radio range of each of the route-side radio devices;
   wherein said route-side radio devices are enabled to transfer received data to a next route-side radio device and the route-side radio device after the next in a direction along the route;
   wherein said vehicle-side radio device and said route-side radio devices are configured to communicate on at least three channels which are different from one another, including a first radio channel, a second radio channel, and a third radio channel;
   wherein each of said route-side radio devices has two transceiver units and a receiver unit, and wherein
   said receiver unit is configured for receiving data unidirectionally from a directly adjacent route-side radio device in each case, on the first radio channel; and
   said two transceiver units are configured for bidirectional communication with the route-side radio device after next in each case, wherein different radio channels are used for each direction for communication along the route, which radio channels differ from the first radio channel in each case; and
   a utilization of the at least three different radio channels per route-side radio device along the route takes place in an alternating, repeating sequence.

2. The ad hoc communication network according to claim 1, wherein each route-side radio device is configured:
   to communicate wirelessly with all route-side radio devices within its radio coverage area; and
   to transmit data received from a first route-side radio device to at least one second route-side radio device which does not lie within the radio coverage area of the first route-side radio device.

3. The ad hoc communication network according to claim 1, wherein a plurality of said route-side radio devices are connected to said monitoring and control unit.

4. The ad hoc communication network according to claim 1, wherein each said route-side radio device is configured:
   to receive unidirectionally on a first channel;
   to communicate bidirectionally in a first direction along the route on a second channel that is different from the first channel; and
   to communicate bidirectionally in a second direction that is different from the first direction along the route on a third channel that is different from the first and second channels.

5. The ad hoc communication network according to claim 1, wherein:
   in a first triplet of adjacent route-side radio devices consisting of a first route-side radio device, a second route-side radio device, and a third route-side radio device, said adjacent route-side radio devices together use the first radio channel, wherein only said first route-side radio device and said third route-side radio device of said first triplet are configured to send data, while said second route-side radio device is exclusively configured to receive data; and
   in a second triplet of adjacent route-side radio devices, which directly follows said first triplet and which consists of said second route-side radio device, said third route-side radio device, and a fourth route-side radio device, said adjacent route-side radio devices of said second triplet together use the second radio channel, and wherein only said second route-side radio device and said fourth route-side radio device of said second triplet are configured to send data, while said third route-side radio device is exclusively configured to receive data; and
   in a third triplet of adjacent route-side radio devices, which directly follows said second triplet and which consists of said third route-side radio device, said fourth route-side radio device, and a fifth route-side radio device, said adjacent route-side radio devices of said third triplet together use the third radio channel, and wherein only said third route-side radio device and said fifth route-side radio device of said third triplet are configured to send data, while said fourth route-side radio device is exclusively configured to receive data.

6. The ad hoc communication network according to claim 1, wherein:
   a first route-side radio device is configured to receive data from its two directly adjacent route-side radio devices via the third channel by way of the receiving unit of said first route-side radio device; and
   a second route-side radio device, which is arranged directly adjacent said first route-side radio device in a first direction along the route, is configured to receive data from its two directly adjacent route-side radio devices via the second channel by way of the receiver unit of said second route-side radio device; and
   a third route-side radio device, which is arranged directly adjacent said second route-side radio device in the first direction along the route, is configured to receive data from its two directly adjacent radio devices via the first channel by way of the receiver unit said third route-side radio device.

7. The ad hoc communication network according to claim 1, wherein the at least one vehicle is a train.

8. The ad hoc communication network according to claim 7, wherein said at least one vehicle-side radio device is a train-mounted piece of radio equipment, said route-side radio devices are track-side pieces of radio equipment installed along a train track, and said track-side pieces of radio equipment are configured to communicate with said monitoring and control unit.

* * * * *